2,906,003
STOCK BAR FEED APPARATUS

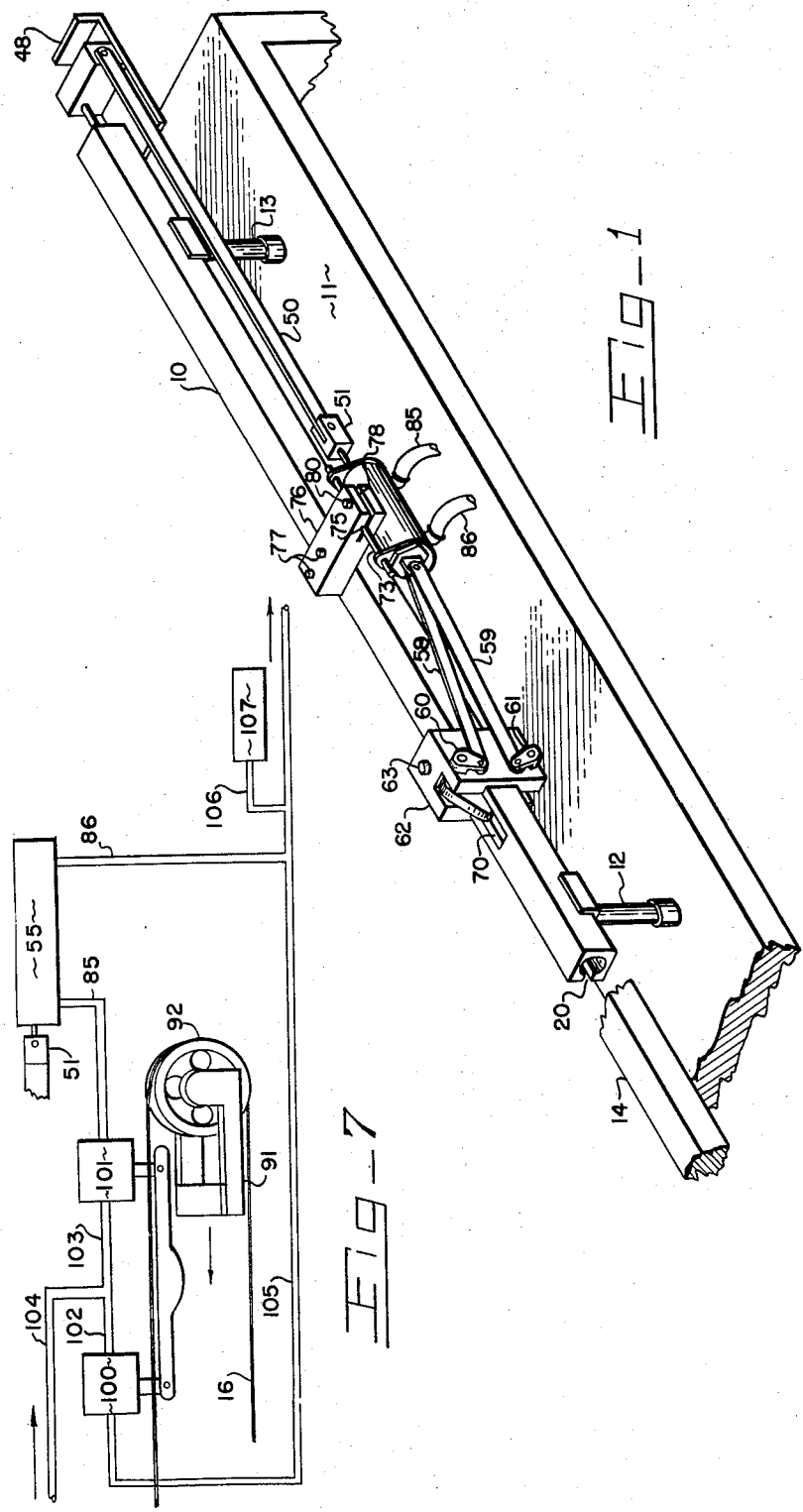

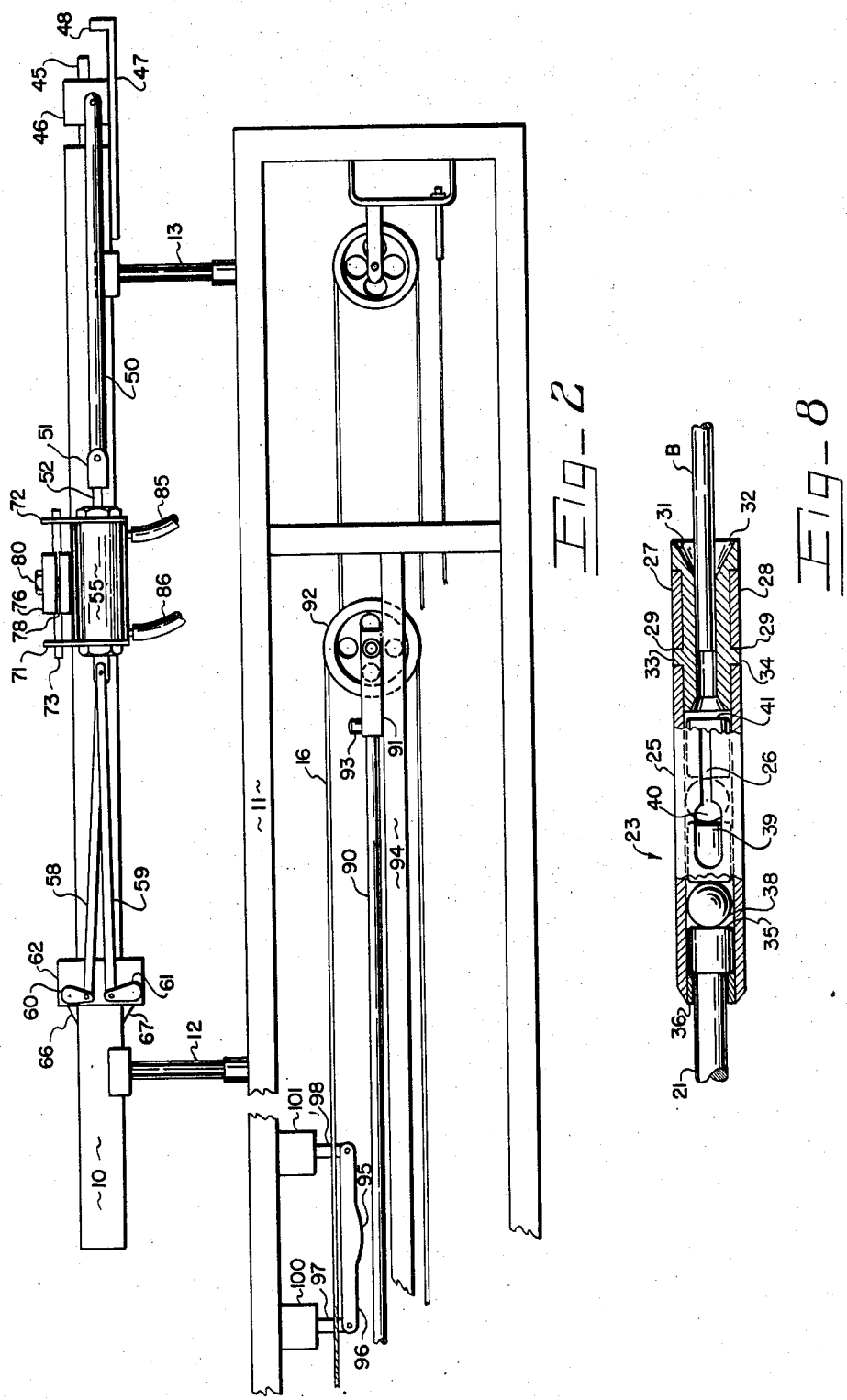

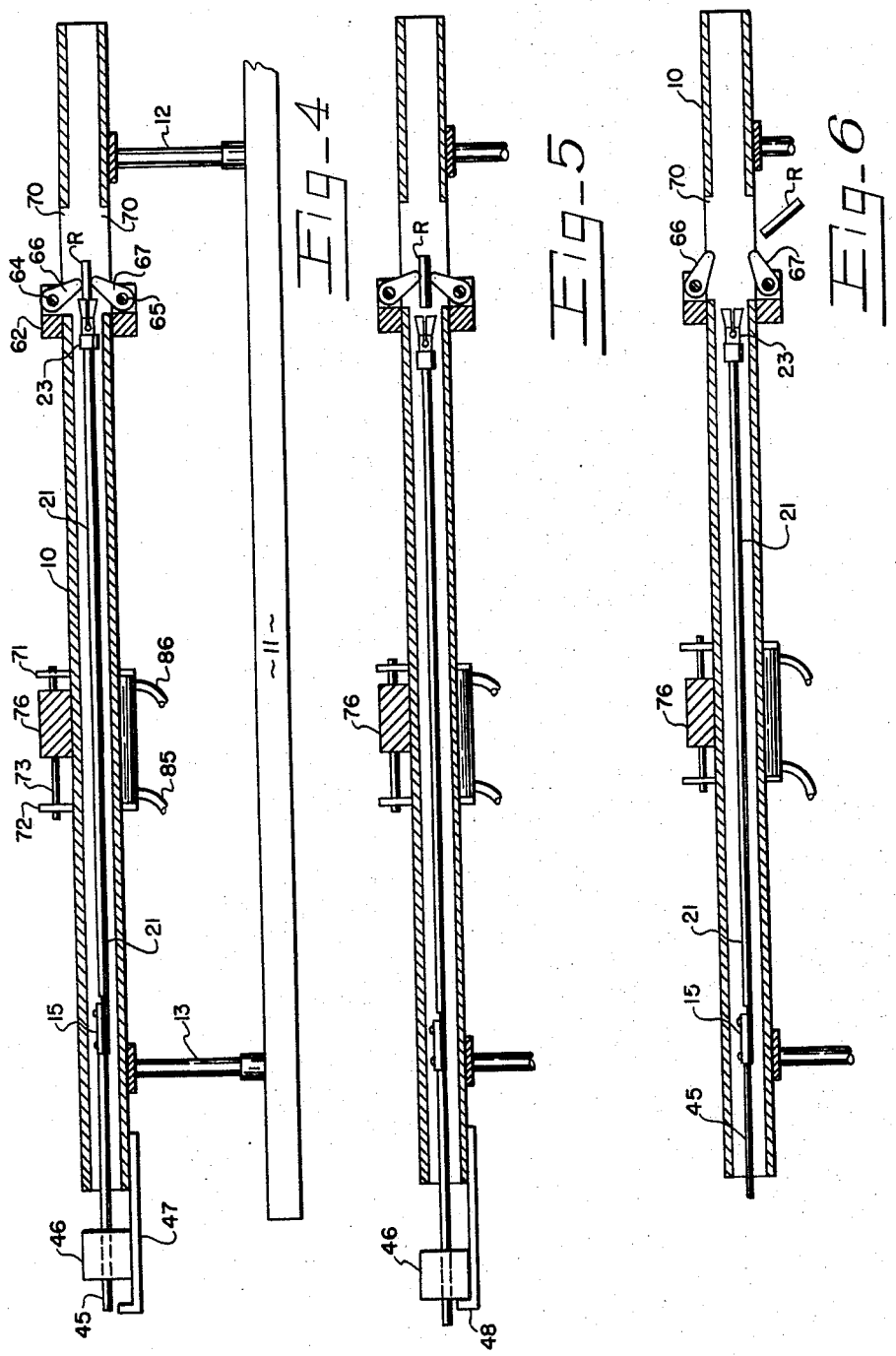

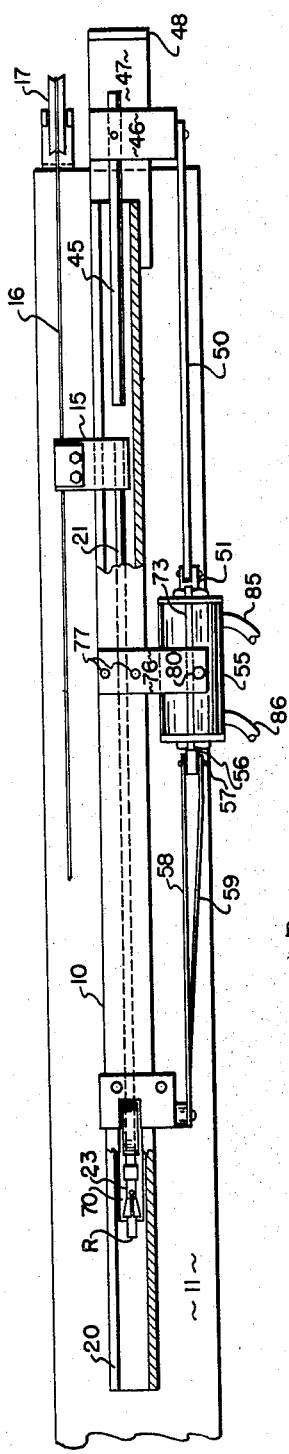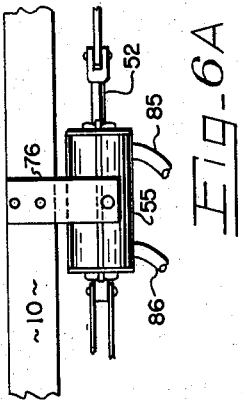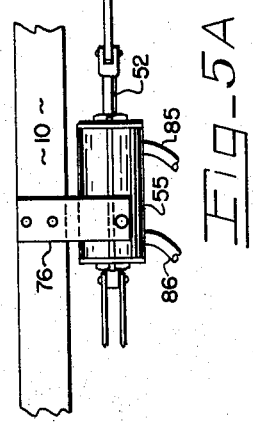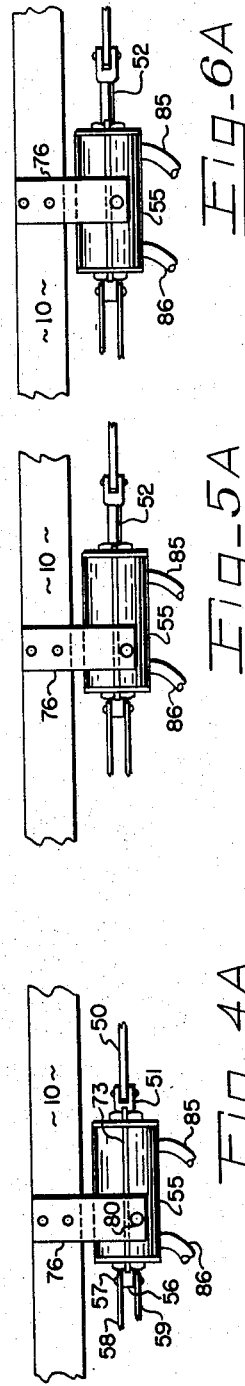

Franklin D. Lakins, Nedrow, and Gerald B. Lanphere, Syracuse, N.Y., assignors to Lipe-Rollway Corporation, Syracuse, N.Y., a corporation of New York Application November 25, 1957, Serial No. 698,820

5 Claims. (Cl. 29—93)

This invention relates to stock bar feed apparatus for feeding stock bars to automatic bar working machines. Apparatus of this type is disclosed in Patent No. 2,595,522, issued May 6, 1952, to B. C. Harney. The apparatus of that patent consists of a stock bar guide tube which is automatically supplied with stock bars. The tube is arranged in axial alignment with the spindle of the bar working machine and the bars are advanced forwardly in the tube by a bar pusher. When the stock bar has been used up in the formation of the work pieces to a point where there no longer remains enough of the bar to making a good work piece, this remainder is known as the "remnant" and has to be ejected from the guide tube prior to the loading of a new bar into the tube.

Normally, this remnant is ejected by pushing it through the collet of the bar working machine. However, in certain bar working machines, because of the tooling arrangement and for other reasons, it is impossible to eject the remnant forwardly through the collet of the bar working machine.

This invention has as an object an automatic stock bar feeding apparatus embodying a structural arrangement which functions automatically to eject the remnant of the exhausted stock bar from the stock bar pusher upon its return to the rearward portion of the guide tube.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a perspective of the apparatus.

Figure 2 is a fragmentary elevation of the invention.

Figure 3 is a fragmentary plan view of the invention shown partly broken away and partly in section.

Figures 4, 5 and 6 are elevational sectional views similar to Figure 2.

Figures 4A, 5A and 6A are fragmentary views similar to Figure 3 and correspond to Figures 4, 5 and 6.

Figure 7 is a schematic illustration of the fluid control circuit of the invention, and Figure 8 is a fragmentary view shown partly broken away and partly in section of a portion of the invention.

As disclosed in Patent No. 2,595,522, the bar feed apparatus consists of a bar feed tube having a breech section and a loading section. A stock pusher, which is located in the breech section while a new piece of bar stock is positioned in the loading section, moves forwardly out of the breech section to contact a new bar and feed it in step by step relation to the bar working machine.

In Figure 1, the breech section 10 has been shown as being mounted on a support 11 by means of a pair of stanchions 12 and 13. The ejector apparatus is mounted on the breech section 10 of the bar feed apparatus and operates in the following manner.

As a new bar is positioned in the loading section 14 of the bar feed apparatus, the stock pusher moves forwardly out of the breech section to contact the bar. The pusher has a yieldable collet which grips the rear end of the bar to move it forwardly through the loading section toward the bar working machine. When the new bar is exhausted to the point where only the remnant remains, the pusher with the remnant gripped therein returns to the breech section of the tube. As the pusher moves rearwardly into the breech section 10, it contacts a stop positioned on the breech section of the bar feed guide tube. In the arrangement herein shown, this stop is connected by suitable linkage, as will be described, to a pair of jaws which are mounted on the breech section 10. These jaws move in a pivotal fashion into the breech section to grip the remnant held in the collet of the pusher. Thereafter, as the stock pusher moves further rearwardly, the pusher is separated from the remnant, so that the jaws alone clamp the remnant. At this point, by means of a fluid control system, the jaws are moved to an open position so as to release the remnant, which then drops through an ejection slot formed in the breech section of the bar feed guide tube. As the jaws open, a new bar is simultaneously fed into the loading section of the tube and the stock pusher then moves forwardly again through the open jaws to grip and move the new bar forward in step by step relation to the bar working machine, as more specifically set forth in Patent No. 2,595,522.

Referring now to Figure 3, the stock pusher consists of a flag 15 which is attached to the cable 16 trained over the pulley 17 and connected to the main cylinder of the bar feeding machine through a suitable block and tackle arrangement (not shown), as is described in the above-referred to patent. Connected to the inner end of the flag 15, which extends through an axial slot 20 formed in the breech section of the tube, is a pusher bar 21. The yieldable collet 23 is fixed to the forward end of the pusher bar 21, as shown in Figures 3, 4, 5 and 6.

Referring to Figure 8, it will be seen that the collet 23 is made up of a metallic spring metal casing 25 which is formed with a pair of axially sawed slots 26. The slots 26 form at the forward end of the casing 25, a pair of fingers 27 and 28, which are provided with square apertures 29.

A two-piece jaw arrangement consisting of jaws 31 and 32 are mounted in the fingers 27 and 28 by means of the upstanding lugs 33 and 34 which are also square in cross section and are received in the apertures 29, thereby providing a yieldable collet to receive the rear end bar stock B. The pusher bar 21 is formed at its forward end with a knob 35 which is held in the casing 25 by means of the bushing 36 suitably affixed to the rearward end of the casing 25, as by welding. Adjacent the knob 35 is a bearing 38 and a spacer 39 and another bearing 40 and a final spacer 41, all whereby the sleeve 25 is free to rotate with the rotating bar B on the pusher rod 21.

As will be obvious, when the collect 23 is moved forwardly into the loading section of the bar feed guide tube, the collet jaws 31 and 32, which are formed with a tapered opening, as is shown in Figure 8, will enclose and grip the rear end of the bar B. When the bar B is exhausted, so that only a remnant remains, the remnant R, as shown in Figure 3, will be gripped by the jaws 31 and 32 of the collet 23, so as to move the remnant R rearwardly out of the loading section of the bar feed guide tube and away from the bar working machine into the breech section 10.

As best seen in Figure 3, as the flag 15 moves rearwardly in the breech section 10, it will strike a stop bar 45 which extends into the rear end of the breech section 10 a predetermined distance. The stop bar 45 is mounted in fixed relation in a stop block 46 which, in turn, is supported by an L-shaped stop plate 47. The plate 47 is fixed by suitable means, such as welding or the like, to the under side of the rear end of the breech section 10, and the plate 47 terminates in an upstanding portion 48 which serves as a limit stop for the rearward block 46.

Affixed to the block 46 is a link 50 which extends exteriorly of the tube 10 forwardly in parallel relation to the stop bar 45. The link 50 is connected by means of a yoke 51 to the piston rod 52 of a cylinder 55. The blank end of the cylinder 55 is formed with a stud 56 which is connected by means of a pin 57 to a pair of links 58, 59. The links 58 and 59 are pivotally connected at their forward ends to a pair of jaw levers 60 and 61, respectively. The jaw levers are carried in a block 62 mounted on the breech section 10 by means of a fastener 63. The jaw levers 60 and 61 are fastened to a pair of shafts 64 and 65 respectively, which extend inwardly in the block 62 and are fixed at their inner ends to a pair of jaws 66 and 67. As best seen in Figures 1, 4, 5 and 6, the breech section 10 is formed with an axially extending ejection slot 70 into which the jaws 66 and 67 move in a pivotal fashion for a purpose hereinafter described.

The cylinder 55, as best seen in Figure 2, is provided at each end with a pair of ears 71 and 72. A rod 73 is mounted in fixed relation on the upper ends of the ears 71 and 72. The rod 73 is received in an axial bore 75 formed in a block 76 which is mounted on the breech section 10 by a pair of fasteners 77. The block 76 is formed with a horizontal slot 78 which extends inwardly in the block 76 to intersect the bore 75, and a fastener 80 extends through the outer end of the block 76 so as to permit the adjustment of the frictional contact between the rod 73 and the bore 75 in the block 76, for a purpose to be hereinafter described.

When the flag 15 strikes the stop bar 45, this motion is transmitted to move the block 46 and in turn the link 50 rearwardly on the stop plate 47. As will be later explained, the cylinder 55 moves as a unit by virtue of the rod 73 on the block 76 to move the links 58 and 59 rearwardly. This motion of the links 58 and 59 moves the jaw levers 60 and 61 about the shafts 64 and 65 to move the jaws 66 and 67 through the slot 70 and into the tube 10 to grip the bar remnant R, which is carried by the collet 23, as seen in Figure 4.

Thereafter, continued movement of the flag 15 rearwardly moves the block 46 into engagement with the stop 48 and serves to pull the collet 23 rearwardly off from the remnant R to the position shown in Figure 5. This further motion, or over-travel, is accomplished by moving the piston rod 52 out of the cylinder 55 against the pressure delivered to the rearward side of the piston through the line 85. Since the pressure in the main cylinder of the bar feed apparatus is greater than the pressure delivered by the line 85, the piston rod 52 will move rearwardly with the link 50 and block 46, so as to move the collet 23 off from the remnant R, as previously explained.

At this point, by means to be hereinafter explained, the pressure delivered by line 85 to the rearward side of cylinder 55 is exhausted through the line 85 and pressure is supplied to the opposite side of the piston in the cylinder 55 by the line 86. This pressure causes the cylinder itself to move in a forward direction to the position shown in Figure 6A. This motion of the cylinder is transmitted to the jaws 66 and 67 through the levers 58, 59, 60 and 61, as previously explained, to open the jaws 66 and 67 to the position shown in Figure 6 to allow the remnant R to drop freely out of the tube 10 through the slot 70, thereby accomplishing the ejection of the remnant. Simultaneously, a new bar has been fed into the magazine section of the bar feed guide tube (not shown) as explained by the patent hereinbefore referred to, and the pusher bar 21 and collet 23 are now free to move forwardly past the open jaws 66 and 67 and out of the breech section 10 into engagement with the new bar in the magazine section of the tube.

As the bar is fed forward by the stock pusher, which comprises the flag 15, pusher bar 21 and collet 23, by means of the cable 16, the bar is automatically used up in the bar working machine to make work pieces. The bar pusher motion is achieved by means of the main cylinder of the bar feed apparatus as disclosed in the patent referred to, which includes the piston rod 90 which extends rearwardly, as best seen in Figure 2, and is connected to the yoke 91 which carries the tackle block pulleys 92, which are connected by the cable 16 to the flag 15, all of which is disclosed in Patent No. 2,595,522. The yoke 91 is provided with a cross bar 93 which serves as a valve actuator. When the bar stock has been used up, and the pusher is returning to the breech section to pick up a freshly loaded bar, the yoke 91 moves to the left along the guide rail 94, as seen in Figure 2. At this point, the pressure which is supplied to the return side of the main cylinder to move the yoke 91 forwardly, or to the left as viewed in Figure 2, is supplied also through line 85 to the rear side of the cylinder 55. The pressure which was previously supplied through line 86 to the opposite end of the cylinder 55 in order to open the jaws 66 and 67 to eject the remnant R, as was previously explained, has in the meantime been bled off to atmosphere so that when the pressure is now supplied through line 85 to the cylinder 55, this pressure acts to move the piston rod 52 into the cylinder 55 to reset the stop bar 45 to the position shown in Figure 3.

After the remnant R has been gripped by the jaws 66 and 67, as was previously described by the striking of the stop bar 45, and the collet 23 has been moved off of the remnant, the yoke 91 has been moved forwardly along the guide rail 94 to a point where the cross bar 93 comes into contact with a cam surface 95 formed on a connector bar 96 which rigidly connects the actuators 97 and 98 of valves 100 and 101 respectively. This actuates valves 100 and 101, and serves to exhaust the pressure from the rearward side of the cylinder 55 through line 85 and to put pressure on the forward side of the cylinder 55 through the line 86 which, as previously explained, operates to open the jaws 66 and 67 to allow the remnant R to drop out of the breech section 10 through the slot 70.

Referring now to Figure 7, a schematic diagram of the fluid pressure circuit for operating the apparatus in the above described manner has been illustrated. In this diagram, the valves 100 and 101 are connected by means of the lines 102 and 103 to line 104. Line 104 is the line which supplies pressure to the return side of the main cylinder of the bar feed apparatus. Valve 101 is a three-way normally open valve so that when pressure is supplied to line 104, this pressure passes through line 103 and the valve 101 into the line 85 and is delivered to the rearward side of the cylinder 55, as was previously described. When valves 101 and 100 are actuated, the valve 101 is open to atmosphere to exhaust the pressure on the rearward side of the cylinder 55 through the line 85. Simultaneously, the pressure supplied through the line 104 now passes through the valve 100 by means of line 102 and into the line 105. This pressure is supplied to the line 86 which puts the pressure on the forward side of the cylinder 55 to move it forwardly, as was previously described, to unclamp the jaws 66 and 67 on the remnant R, thereby allowing it to be ejected. At the same time, the pressure in line 105 is fed to the stock tube shift cylinder, not shown, of the bar feed apparatus described in Patent No. 2,595,522, in order to load a fresh bar in the magazine section of the bar feed guide tube, and the main cylinder is now reversed to move the yoke 91 and pulleys 92 to the right, as viewed in Figure 7. While the new bar is being fed into the bar working machine, the pressure on the forward side of the cylinder 55 is bled off to atmosphere through the line 106 and bleeder 107 so as to allow the stop bar 45 to be reset when the pressure is again supplied to the rearward side of the cylinder 55 through line 104, line 103, normally open valve 101 and line 85.

Referring now to Figures 3, 4, 5 and 6, and Figures 4A, 5A and 6A, wherein the various positions of the apparatus are illustrated, the operation will be described briefly. As the stock pusher is moved rearwardly, the collet 23 carrying the remnant R is moved through the open jaws 66, 67, rearwardly toward the stop bar 45, as is illustrated in Figure 3. In this position, the cylinder 55 has pressure on its rearward end through line 85 and is positioned on the middle of the block 76 and the stop block 46 is positioned at the forward end of the plate 47.

After the flag 15 has contacted the stop bar 45, the block 46 has moved rearwardly on the plate 47 to the position shown in Figure 4. Also, the cylinder 55 has moved rearwardly with respect to the block 76, since the pressure on the rear side of the cylinder is greater than the clamping force the block 76 exerts on the rod 73, as seen in Figure 4A, in which position the remnant R has been gripped by the jaws 66 and 67.

The continued pressure on the stock pusher through the cable 16 causes the block 46 to move rearwardly on the plate 47 into contact with the upstanding stop 48, as shown in Figure 5. This over-travel is effected by moving the piston rod 52 out of the cylinder 55 against the pressure supplied to the rearward side of the cylinder 55 through the line 85. This position of the cylinder and rod with respect to the block 76 is shown in Figure 5A.

Thereafter, the pressure is supplied to the forward side of the cylinder 55 through the line 86 and exhausted from the rearward side of the cylinder 55 through the line 85 by the actuation of the valves 100 and 101, as previously described, to move the cylinder 55 forwardly with respect to the block 76 to the position shown in Figure 6A and wherein the piston rod 52 is still in the extended position. This motion of the cylinder 55 forwardly with respect to the block 76 opens the jaws 66 and 67 to permit the ejection of the remnant R, as was previously explained, and as is shown in Figure 6. Thereafter, a new bar is fed to the magazine section of the tube and is pushed forwardly and gripped by the collet 23, as was previously explained. When the bar is used up and through the control arrangement disclosed in Patent No. 2,595,522, pressure is supplied to the return side of the main cylinder. This pressure is supplied also to the rearward side of the cylinder 55 through the line 85, as was previously explained, to move the rod 52 into the cylinder 55 and thus move the stop bar 45 forwardly in the breech section 10 to reset the apparatus.

As will be obvious by our new and improved apparatus, we have provided means whereby the bar remnant may be moved rearwardly and positively ejected from the bar feed apparatus.

What we claim is:

1. Stock bar feed apparatus for use in connection with automatic bar working machines, said apparatus comprising a stock bar guide tube for guiding the stock bar into said machine, the forward end of said tube being arranged in juxtaposition to the bar working machine, said tube being formed in its rearward portion with a bar remnant ejection slot, a bar pusher mounted for forward and return movement in said guide tube, means for moving said stock bar pushed forwardly to feed the stock bar into said bar working machine, said pusher having means for yieldingly gripping the rear end of the stock bar, and means for engaging the rear end remnant portion of the stock bar and operable upon movement of said pusher into the rear portion of said guide tube for ejecting said remnant portion of the bar from said pusher through said ejection slot.

2. Stock bar feed apparatus comprising a stock bar guide tube with the front end thereof positioned in proximity to a bar working machine, a stock bar pusher slidably mounted in said tube for forward and return movement and having means for yieldingly gripping the rear end of the stock bar, a stop member carried by said tube and engageable by said pusher upon return movement thereof into the rear portion of said tube, and means operable upon engagement of the pusher with said stop member to eject the bar remnant from the pusher.

3. Bar feeding apparatus for use in connection with bar working machines comprising a stock bar guide tube having a breech section and a loading section, a stock pusher movable forwardly and rearwardly in said tube to feed bar stock into said bar working machine, said stock pusher including means for yieldably gripping a piece of bar stock, a slot formed in said breech section and automatic means for extracting the bar remnant held in said yieldable gripping means, when said stock pusher is moved rearwardly in said breech section, including means for clamping said remnant and moving said gripping means off of said remnant, means for releasing said clamping means whereby to drop said remnant out of said tube through said slot.

4. In a bar feeding machine having a bar feed guide tube for use in connection with a bar working machine, means for ejecting a bar remnant comprising a yieldable bar gripper for moving said remnant to the rear of the bar feed guide tube, means for clamping the remnant adjacent the yieldable gripper, means for moving said gripper off of said remnant after said remnant has been clamped, a slot formed in said tube adjacent said clamping means whereby, when said clamping means are released, said remnant will drop out of said tube through said slot.

5. Bar remnant ejection means for use in connection with bar feeding machines having a bar feed guide tube comprising a stock bar pusher including a yieldable chuck for gripping a piece of bar stock, means for moving said pusher to the rear of said guide tube when said bar stock has been used up in order to position the remnant of said bar stock for ejection, a stop bar located in the rear of said tube and means for connecting said stop bar to a pair of jaws, said jaws being pivotally mounted on said tube for movement into and out of position whereby they grip said remnant when said pusher strikes said stop bar, means for moving said pusher further rearwardly after said jaws have gripped said bar in order to extract said remnant from said chuck, and fluid pressure control means for moving said jaws out of engagement with said remnant to drop said remnant through a slot formed in said tube, said fluid pressure control means being further operable to reset said stop bar after said pusher has moved past said fingers and has completed the feed of a new piece of bar stock.

No references cited.

Notice of Adverse Decision in Interference

In Interference No. 91,691 involving Patent No. 2,906,003, F. D. Lakins and G. B. Lanphere, Stock bar feed apparatus, final judgment adverse to the patentees was rendered Aug. 20, 1962, as to claim 1.

[*Official Gazette September 18, 1962.*]